Patented Apr. 11, 1950

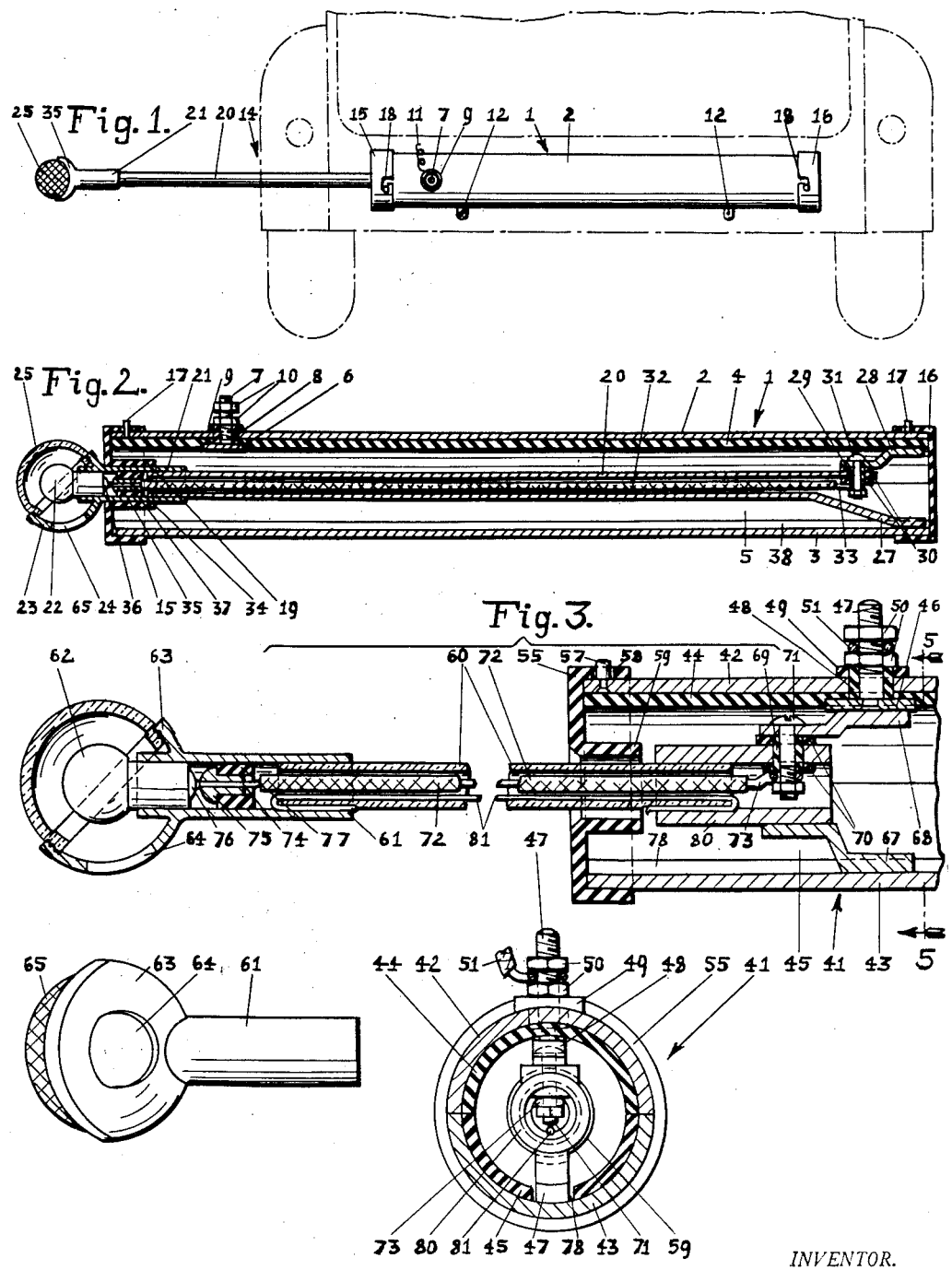

2,503,974

UNITED STATES PATENT OFFICE 2,503,974

REPAIR AND WARNING LAMP FOR VEHICLES

Albert R. Sparaco, Marlboro, N. Y.

Application January 5, 1949, Serial No. 69,309

3 Claims. (Cl. 177—329)

The present invention relates to accessories for automobiles and other vehicles and, more specifically, to a new and improved repair and warning lamp for vehicles.

Emergency repairs on crowded highways at night time, such as the changing of a wheel of an automobile, or the like endanger the life of the person working on the vehicle unless warning is given to the oncoming other vehicles, so that the latter pass by at a safe distance and do not hit the operator working on the defective vehicle. The tail lights as well as the front lights of the defective vehicle do not indicate whether or not a person is working on that side of the vehicle which faces the center of the road.

Therefore, one object of the present invention is the provision of a device of the character described which can be attached easily to the end of a vehicle—usually to the rear end—and which normally does not protrude laterally beyond the vehicle, but a part of which can be pulled out laterally at a distance of about three feet, and which carries at its outer end a source of light for indicating the distance which is to be kept clear at one side of the vehicle.

Another object of the present invention is the provision of a device of the character described which will be illuminated automatically if its source of light is pulled out laterally, and whose source of light will be disconnected automatically from the battery of the vehicle or from any other suitable source of current when its source of light has been pushed back into the device, so that no separate switch has to be operated for turning on or for extinguishing my new and improved repair and warning lamp for vehicles.

Still another object of the present invention is the provision of a device of the character described which also will throw a beam of light on one side of the vehicle, so that the person making the repair does not need an additional light for carrying out the work, and that a warning light will be emitted toward the front as well as toward the rear of the vehicle.

A further object of the present invention is the provision of a device of the character described which can be attached simply and without the application of any considerable amount of skill to newly manufactured vehicles as standard equipment as well as to vehicles already in use, and which is light in weight and of a pleasant outer appearance.

Yet still a further object of the present invention is the provision of a device of the character described which is simple in construction, so that it can be manufactured and sold at a very reasonable price, but which is also sturdy, durable, reliable in use, and well adapted to withstand the rough usage to which devices of this type frequently are subjected.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawings the preferred forms of the invention have been shown.

In said drawings:

Figure 1 is a diagram of a preferred embodiment of my invention as it appears when it is expanded on the rear of a passenger automobile;

Fig. 2 is a longitudinal sectional view of the device as it appears when not in use;

Fig. 3 is a fractional enlarged longitudinal sectional view of a slightly modified embodiment of my invention, showing the device expanded;

Fig. 4 is a detailed front view of a lamp socket with globe; and

Fig. 5 is a cross-sectional view on the line 5—5 of Fig. 3.

Similar reference characters refer to similar parts throughout the several views.

Referring first to Figs. 1 and 2, the numeral 1 denotes a tubular body of conductive material, which may be made as a vertical tube, or—as shown—from a pair of shells 2 and 3 of metal, which are semi-circular in cross-section having their longitudinal edges detachably joined to one another so that the shells form a tubular body and being provided at their inner sides with insulation 4 and 5. A conductive member 6 is provided at the inner side of the end portion of one of said shells being insulated from the shell 2 by a portion of the insulating layer 4 into which it is partially embedded. The numeral 7 denotes a conductive, threaded bolt connected to said conductive member being extended through the wall of the shell 2 and insulated therefrom by an insulating bushing 8 and an insulating washer 9. Nuts 10 are screwed upon the bolt 7, and a wire 11 (Fig. 1) can be secured to the bolt 7 by inserting its end between the nuts 10 and tightening the latter. The wire 11 connects the bolt 7 (and the member 6) to one terminal of the battery (not shown) of the vehicle or to any other suitable source of current. The body 1 is provided with lugs 12 (Fig. 1) or with any other suitable means for facilitating its attachment to a vehicle 14. The latter is indicated fractionally in dash-and-dotted lines in Fig. 1.

Both ends of the body 1 preferably are closed by any suitable means, preferably by means of end caps 15 and 16 of insulating material or the like. In order to facilitate the opening of the body 1—if the latter consists of shells 2 and 3 as shown—I prefer to provide at least one of said shells with short radiating pins 17 which engage slots 18 in the flange portions of the caps 15 and 16. Thus the latter can be removed easily and one shell can then be taken off the other for the purpose of cleaning the interior of the device, or the like.

The cap 15 has a central aperture, which preferably is surrounded by an inwardly extending flange portion 19, and a pipe 20 of conductive material is slidably extended therethrough. A socket 21 holding a lamp bulb 22 is secured to that end of said pipe which protrudes beyond the tubular body and having a laterally inclined semi-spherical hollow head portion 23, which is provided with a perforation 24. A preferably semi-spherical globe 25 of transparent material for instance of glass being colored red and having a polygonal or a diamond-shaped outer surface, is screwed into, or otherwise secured to the head portion 23. A portion of that end of the conductive pipe 20 which is opposite the socket 21 is formed as a contact member 27. Another contact member 28, adapted for engaging the member 6 when the pipe 20 is in the position shown in Fig. 1, is secured to the end of the pipe 20 opposite the member 27 and is insulated from the pipe 20. In the instance shown there is extended an insulating bushing 29 through the parts 20 and 28 as well as through a pair of insulating washers 30, and a conductive screw 31 is extended through the bushing 29. An insulated wire 32 has its terminal 33 secured to the screw 31, whereas its other terminal 34 is soldered into a conductive end piece 35, which rests against the center terminal 36 of the lamp bulb 22. In order to insure a permanent contact between the parts 35 and 36 I prefer to insert a rubber bushing 37 tightly into the socket 21 and to extend the end piece 35 therethrough. The insulation 5 of the shell 3 is interrupted by a longitudinal slot 38, and the contact member 27 is slidable in said slot and in frictional engagement with the inner conductive portion of the shell 3, which is grounded. Thus when the rod 20 is pulled out of the body 1, as shown in Fig. 1, and the member 28 touches the member 6, the circuit is closed and the lamp 22 burns, illuminating the globe 25 and throwing light through the perforation 24 laterally upon the vehicle 14. If the pipe 20 is pushed into the body 1 (Fig. 2) the lamp 22 is automatically switched off, and the socket 21 fits tightly into the flange portion 19, so that the position of the pipe 20 cannot be changed relative to the body 1 by vibrations or the like. The outer side of the pipe 20 preferably is painted with a luminous paint.

Referring now to Figs. 3, 4 and 5 the parts 41 to 51, 55 to 59, 61 to 65, and 75 to 78 are the same as the corresponding parts 1 to 11, 15 to 19, 21 to 25, and 35 to 36 of the embodiment of Figs. 1 and 2. Only the pipe 60 is made of non-conductive, preferably transparent material, such as glass or the like, and a conductive metal member 80 is secured to that end of the pipe 60 which is opposite the socket 61. A first contact member 67 is secured to the member 80 by means of soldering, welding or the like, or is formed as a unit therewith, and is slidable in the groove 78 and in frictional engagement with the conductive, grounded shell 43. A second contact member 68 is attached to the member 80 and insulated therefrom by means of an insulating bushing 69 and a pair of insulating washers 70. A conductive screw 71 extends through the parts 68, 69 and 80. An insulated wire 72 has its terminal 73 secured to the screw 71, whereas its other terminal 74 is soldered to the conductive end piece 75. A blank wire 81 is also extended through the pipe 60 and forms a conductive connection between the metal member 80 and the socket 61.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having thus fully described my said invention, what I claim as new and desire to secure by Letters Patent in the United States is:

1. A repair and warning lamp for vehicles comprising a pair of longitudinal shells having their longitudinal edges detachably joined to one another so that the shells form a tubular body and being provided at their inner sides with insulation, a conductive member provided at the inner side of the end portion of one of said shells being insulated from the latter and extended through the insulation at the inner side of the shell, a conductive bolt connected to said conductive member being extended through the wall of the shell and insulated therefrom, a cap engaging each of the end portions of said shells and holding them together so that the shells form a tubular body, a pipe slidably extending through one of said caps into the tubular body, a socket holding a lamp being secured to that end of said pipe which protrudes beyond the tubular body and having a semi-spherical hollow head that is provided with a perforation, a transparent semi-spherical globe being secured to said head, and a pair of contact members provided at the other end of said pipe being in conductive connection with the terminals of the lamp in said socket, one of said contact members being adapted for engaging the conductive member in one of said shells when the main portion of said pipe is pulled out from the tubular body, the other shell having its insulation interrupted by a longitudinal slot extending throughout its length, the other contact member being slidable in said slot in frictional engagement with the inner conductive portion of the shell, and said hollow head being laterally inclined relative to said socket.

2. A device of the character described comprising a pair of longitudinal shells having their longitudinal edges detachably joined to one another so that the shells form a tubular body and being provided at their inner sides with insulation, a conductive member provided at the inner side of the end portion of one of said shells being insulated from the latter and extended through the insulation at the inner side of the shell, a conductive bolt connected to said conductive member being extended through the wall of the shell and insulated therefrom, a cap engaging each of the end portions of said shells and holding them together so that the shells form a tubular body, a pipe slidably extending through one of said caps into said tubular body being made of conductive material and having one of its end portions formed as a contact member, a second contact member being attached to and insulated from said pipe and adapted for engaging the conductive member which is extended through the insulation in one of said shells when the main portion of the pipe is pulled out of said tubular member, a socket holding a lamp being secured to that end of said pipe which protrudes beyond the tubular body and having a laterally inclined semi-spherical hollow head portion that is provided with a perforation, an insulated conductor extended through said pipe connecting said second contact member to the center terminal of the lamp in said socket, and a transparent semi-spherical globe being secured to said head portion, the other shell having its insulation interrupted by a longitudinal slot extending throughout its length, and the contact member formed by an end portion of said pipe being slidable in said slot and in frictional engagement with the inner conductive portion of the shell.

3. A repair and warning lamp for vehicles comprising a pair of longitudinal shells having their longitudinal edges detachably joined to one another so that the shells form a tubular body and being provided at their inner sides with insulation, a conductive member provided at the inner side of the end portion of one of said shells being insulated from the latter and extended through the insulation at the inner side of the shell, a conductive bolt connected to said conductive member being extended through the wall of the shell and insulated therefrom, a cap engaging each of the end portions of said shells and holding them together so that the shells form a tubular body, a pipe slidably extending through one of said caps into said tubular body and being made of transparent material having a metal member at one end, a first contact member secured to and in conductive connection with said metal member, a second contact member being attached to but insulated from said metal member and adapted for engaging the conductive member in one of said shells when the main portion of said pipe is pulled out from the tubular body, a socket holding a lamp being secured to that end of said pipe which protrudes beyond the tubular body and having a laterally inclined semi-spherical hollow head portion that is provided with a perforation, a blank conductor extended through said pipe connecting said metal member to said socket, an insulated conductor extended through said pipe connecting said second contact member to the center terminal of the lamp in said socket, and a transparent semi-spherical globe being secured to said head portion, the other shell having its insulation interrupted by a longitudinal slot extending throughout its length, and said first contact member being slidable in said slot and in frictional engagement with the inner conductive portion of the shell.

ALBERT R. SPARACO.

REFERENCES CITED

The following references are of record in the file of this patent:

UNITED STATES PATENTS

| Number | Name | Date |
| --- | --- | --- |
| 1,164,547 | Rauscher | Dec. 14, 1915 |
| 1,216,435 | Gillies et al. | Feb. 20, 1917 |
| 1,239,934 | Miller | Sept. 11, 1917 |
| 1,312,109 | Doty | Aug. 5, 1919 |